United States Patent
Henry (10) Patent No.: US 10,549,932 B2
(45) Date of Patent: Feb. 4, 2020

(54) SYSTEM AND METHOD FOR REMOVING BLOCKAGES PRESENT IN A DELIVERY CONDUIT OF A SEEDER

(71) Applicant: CNH Industrial Canada, Ltd., Saskatoon (CA)

(72) Inventor: James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 16/540,218

(22) Filed: Aug. 14, 2019

(65) Prior Publication Data
US 2019/0367296 A1    Dec. 5, 2019

Related U.S. Application Data

(62) Division of application No. 15/698,817, filed on Sep. 8, 2017, now Pat. No. 10,421,625.

(51) Int. Cl.
| | |
|---|---|
| *B65G 53/52* | (2006.01) |
| *B65G 53/66* | (2006.01) |
| *A01C 7/20* | (2006.01) |
| *B65G 53/58* | (2006.01) |
| *B65G 53/50* | (2006.01) |
| *B65G 53/16* | (2006.01) |

(52) U.S. Cl.
CPC .............. *B65G 53/66* (2013.01); *A01C 7/206* (2013.01); *B65G 53/521* (2013.01); *B65G 53/58* (2013.01); *B65G 53/16* (2013.01); *B65G 53/50* (2013.01)

(58) Field of Classification Search
CPC .. B65G 53/66; B65G 53/521; B65G 2812/16; B65G 2201/04; B65G 2201/042; B65G 2201/1608; B65G 2201/1616; A01C 7/206; A01C 7/081; A01C 7/082; A01C 15/04

USPC ........... 406/11, 155, 156, 197; 111/174, 175; 340/684

See application file for complete search history.

(56) References Cited

U.S. PATENT DOCUMENTS

| | | |
|---|---|---|
| 3,224,812 A | 12/1965 | Bozich |
| 3,414,330 A | 12/1968 | Trutzschler |
| 3,490,654 A | 1/1970 | Fischer |

(Continued)

FOREIGN PATENT DOCUMENTS

| | | |
|---|---|---|
| EP | 1994815 A1 | 11/2008 |
| EP | 2316257 A1 | 5/2011 |

OTHER PUBLICATIONS

AG Express Electronics, The Vigilense Blockage Sensor Detects the Flow of Material, Dated Oct. 15, 2013 (2 pages).

*Primary Examiner* — Joseph A Dillon, Jr.
(74) *Attorney, Agent, or Firm* — Rebecca L. Henkel; Rickard K. DeMille (57) ABSTRACT

In one aspect, a system for removing blockages present within a delivery conduit of a seeder may include a plurality of delivery conduits, a plurality of flow blocking devices, and a plurality of blockage sensors. A controller may be configured to determine when a blockage is present within a first delivery conduit of the plurality of delivery conduits based on measurement signals received from the plurality of blockage sensors. The controller may be further configured to control the flow blocking devices to occlude the flow of air through the other delivery conduits of the plurality of delivery conduits such that an air pressure in the first delivery conduit is increased.

8 Claims, 7 Drawing Sheets

(56) References Cited

U.S. PATENT DOCUMENTS

| | | | |
|---|---|---|---|
| 3,671,078 A | 6/1972 | Wise | |
| 3,929,379 A * | 12/1975 | Krambrock | B65G 53/521 406/95 |
| 3,945,683 A | 3/1976 | Wise | |
| 4,067,622 A * | 1/1978 | Krambrock | B65G 53/521 406/85 |
| 4,515,503 A | 5/1985 | Snowdon | |
| 4,715,748 A * | 12/1987 | Krambrock | B65G 53/525 406/11 |
| 4,909,676 A | 3/1990 | Heep et al. | |
| 5,147,152 A | 9/1992 | Link | |
| 5,177,470 A | 1/1993 | Repas | |
| 5,224,802 A | 7/1993 | Federhen et al. | |
| 5,429,649 A | 7/1995 | Robin | |
| 5,831,542 A | 11/1998 | Thomas et al. | |
| 5,923,262 A | 7/1999 | Fuss et al. | |
| 5,927,217 A * | 7/1999 | Halford | A01C 7/081 111/174 |
| 6,192,813 B1 * | 2/2001 | Memory | A01C 7/081 111/176 |
| 6,296,425 B1 | 10/2001 | Memory et al. | |
| 6,644,225 B2 | 11/2003 | Keaton | |
| 6,749,373 B2 | 6/2004 | Von Geldern et al. | |
| 7,080,960 B2 | 7/2006 | Burnett | |
| 7,114,889 B2 | 10/2006 | Kanou et al. | |
| 7,213,617 B2 | 5/2007 | Snipes et al. | |
| 8,371,238 B2 | 2/2013 | Dean et al. | |
| 8,469,636 B2 | 6/2013 | Jost et al. | |
| 8,635,963 B2 * | 1/2014 | Friggstad | A01C 7/084 111/175 |
| 2002/0114672 A1 * | 8/2002 | Isozaki | B65G 53/66 406/11 |
| 2005/0074302 A1 * | 4/2005 | Burnett | B65G 43/08 406/56 |
| 2009/0304461 A1 * | 12/2009 | Strohschein | B65G 53/521 406/11 |
| 2012/0039674 A1 | 2/2012 | Callan et al. | |
| 2012/0169495 A1 | 7/2012 | Kowalchuk | |
| 2012/0174843 A1 * | 7/2012 | Friggstad | A01C 7/084 111/174 |
| 2012/0227647 A1 | 9/2012 | Gelinske et al. | |
| 2012/0312211 A1 | 12/2012 | Hubalek et al. | |
| 2013/0085598 A1 | 4/2013 | Kowalchuk | |
| 2013/0276684 A1 | 10/2013 | Wilhelm | |
| 2014/0158033 A1 | 6/2014 | Jagow | |
| 2015/0366127 A1 * | 12/2015 | Roberge | A01M 7/00 239/8 |
| 2016/0157419 A1 | 6/2016 | Henry et al. | |
| 2017/0156258 A1 * | 6/2017 | Reich | H04W 4/70 |
| 2018/0124996 A1 | 5/2018 | Bourgault et al. | |

* cited by examiner

SYSTEM AND METHOD FOR REMOVING BLOCKAGES PRESENT IN A DELIVERY CONDUIT OF A SEEDER

CROSS REFERENCE TO RELATED APPLICATIONS

This is a divisional non-provisional patent application based on U.S. patent application Ser. No. 15/698,817, filed Sep. 8, 2017, entitled, "SYSTEM AND METHOD FOR REMOVING BLOCKAGES PRESENT IN A DELIVERY CONDUIT OF A SEEDER," which is hereby incorporated by reference herein in its entirety.

FIELD

The present disclosure generally relates to row-crop planters or seeders and, more particularly, to systems and methods for removing blockages present in a delivery conduit of a seeder.

BACKGROUND

Modern farming practices strive to increase yields of agricultural fields. In this respect, seeders and other agricultural implements are towed behind a tractor or other work vehicle to disperse seed throughout a field. For example, seeders typically include one or more ground engaging tools or openers that form a furrow or trench in the soil. One or more dispensing devices of the seeder may, in turn, deposit the seeds into the furrow(s). After deposition of the seeds, a packer wheel may pack the soil on top of the deposited seeds.

In certain configurations, an air cart is used to meter and deliver seeds to the dispensing devices of a seeder. For instance, the seeds may be conveyed (e.g., carried by pressurized air) from a hopper of the air cart to the dispensing devices of the seeder by a plurality of delivery conduits. Unfortunately, in some instances, the seeds may be become lodged within the one of the delivery conduits, thereby creating a blockage that prevents the flow of pressurized air through the delivery conduit. As such, the blockage prevents the seeds from being conveyed to the associated dispensing device. In an attempt to remove such blockages, conventional operating systems often increase the operating speed of a fan or other pressurized air source to provide an increased flow of air to the delivery conduits. However, this increased flow of air generally bypasses the blockage by flowing through the unobstructed delivery conduits, thereby rendering the increased flow ineffective for removing the blockage.

Accordingly, an improved system and method for removing blockages within a delivery conduit of an agricultural product distribution system for a seeder would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for removing blockages present within a delivery conduit of a seeder. The system may include a seeder having a plurality of delivery conduits. Each delivery conduit may be configured to convey an agricultural product from a hopper to an associated dispensing device. The system may also include a plurality of flow blocking devices, with each flow blocking device being configured to occlude a flow of air through one of the delivery conduits. The system may further include a plurality of blockage sensors, with each blockage sensor being provided in operative association with one the delivery conduits and configured to detect a parameter indicative of the presence of a blockage within its associated delivery conduit. Additionally, the system may include a controller communicatively coupled to the plurality of blockage sensors and the plurality of flow blocking devices. The controller may be configured to determine when a blockage is present within a first delivery conduit of the plurality of delivery conduits based on measurement signals received from the plurality of blockage sensors. The controller may be further configured to control the flow blocking devices to occlude the flow of air through the other delivery conduits of the plurality of delivery conduits such that an air pressure within the first delivery conduit is increased.

In another aspect, the present subject matter is directed to a method for removing blockages present within a delivery conduit of a seeder. The seeder may include a plurality of delivery conduits and a plurality of flow blocking devices. The method may include receiving, with a computing device, data indicative of a presence of a blockage within a first delivery conduit of the plurality of delivery conduits. The method may further include determining, with a computing device, when the blockage is present within the first delivery conduit. Additionally, the method may include controlling, with the computing device, the flow blocking devices to occlude a flow of air through the other delivery conduits of the plurality of delivery conduits such that an air pressure within the first delivery conduit is increased.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for removing blockages present within a delivery conduit of a seeder. Specifically, in several embodiments, the seeder may include a plurality of delivery conduits and a plurality of flow blocking devices. Each delivery conduit may be configured to convey an agricultural product (e.g., seeds or fertilizer) from a hopper to an associated dispensing device on the seeder. Each flow blocking device may, in turn, be configured to selectively occlude a flow of air through one of the delivery conduits. The system may also include a plurality of blockage sensors, with each blockage sensor being configured to detect a parameter indicative of the presence of a blockage within its associated delivery conduit. In such an embodiment, by monitoring the measurement signals received from the blockage sensors, a controller of the disclosed system may be configured to determine when a blockage is present within one of the delivery conduits. For example, the controller may be configured to determine that one of the delivery conduits is blocked when a pressure differential between first and second locations within such delivery conduit exceeds a threshold.

Additionally, upon determining that one of the delivery conduits is blocked, the controller may be configured to control the various flow blocking devices so as to occlude or cut-off the flow of air through the other unblocked delivery conduits. By occluding the flow of air through all of the remaining unblocked delivery conduits, the associated air flow will, instead, be forced through the blocked delivery conduit. Accordingly, the air pressure within the blocked delivery conduit may increase, thereby allowing the blockage to be removed from such delivery conduit.

Figure 1:
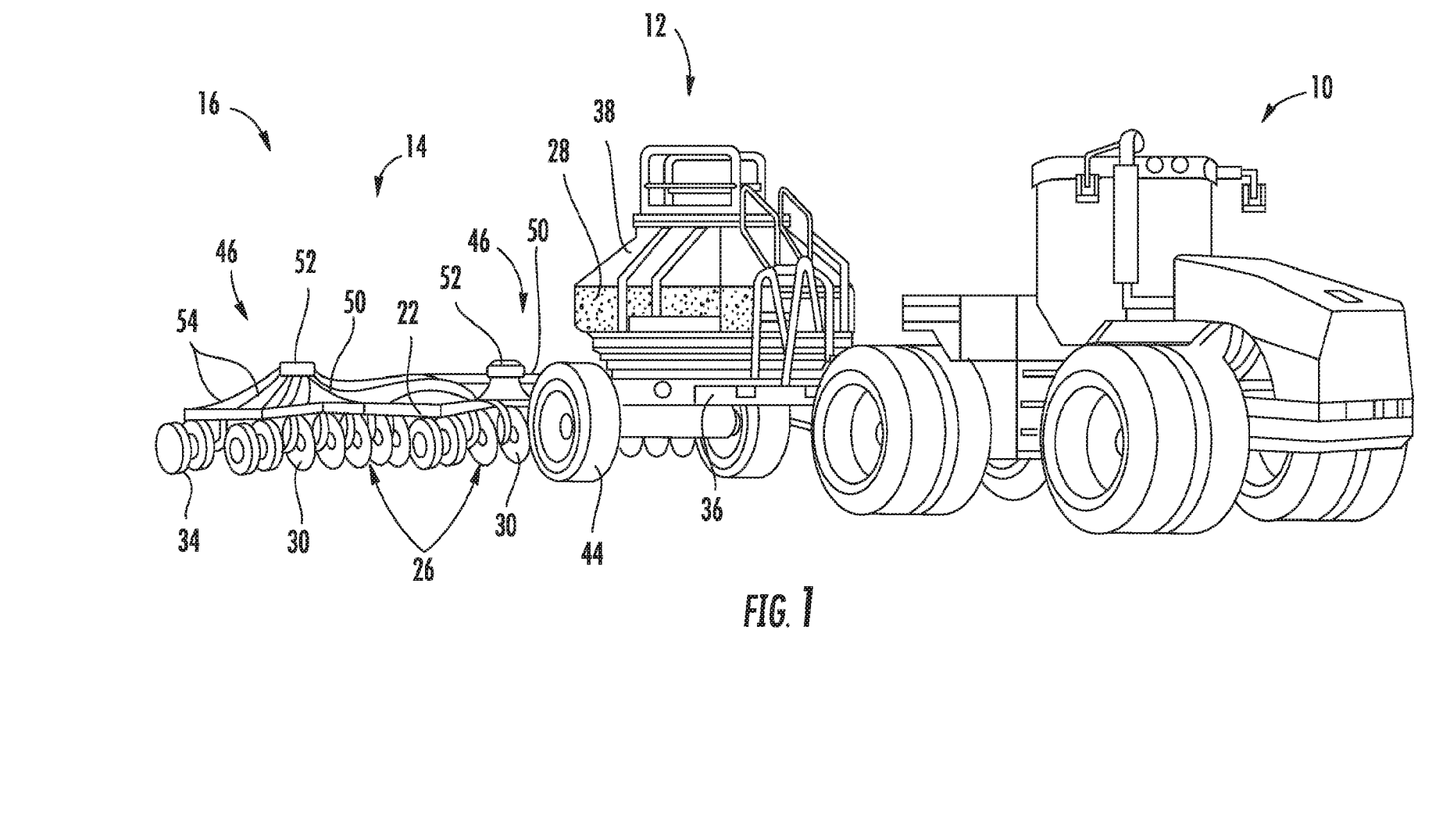
FIG. 1 illustrates a perspective view of one embodiment of a work vehicle, an air cart, and an implement in accordance with aspects of the present subject matter.
Figure 2:
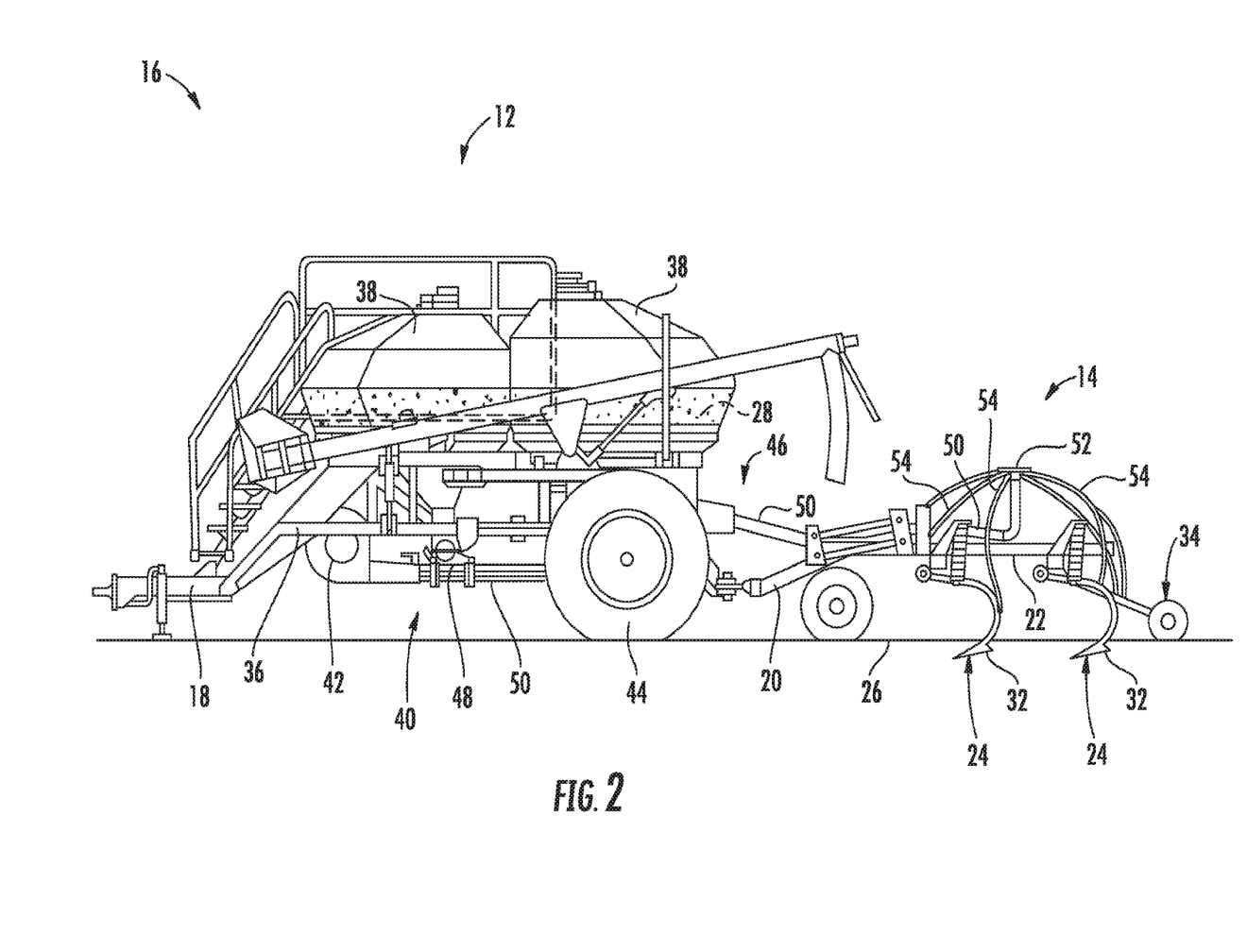
FIG. 2 illustrates a side view of the work vehicle and the air cart shown in FIG. 1 and an alternative embodiment of the implement in accordance with aspects of the present subject matter.

Referring now to FIGS. 1 and 2, embodiments of a work vehicle 10 towing an air cart 12 and an associated implement 14 are illustrated in accordance with aspects of the present subject matter. Specifically, FIG. 1 illustrates a perspective view of the work vehicle 10, the air cart 12, and one embodiment of the implement 14. Additionally, FIG. 2 illustrates an enlarged side view of the air cart 12 and another embodiment of the implement 14. In some embodiments, the air cart 12 and the implement 14 may collectively form a seeder 16. It should be appreciated that, although the work vehicle 10 illustrated herein is configured as a tractor, the work vehicle 10 may generally be configured as any suitable work vehicle known in the art, such as any other agricultural vehicle, and/or the like. It should also be appreciated that, although the implement 14 illustrated herein corresponds to a seed drill, the implement 14 may generally correspond to any suitable equipment or implement, such as another seed dispensing implement, a fertilizer dispensing implement, a tillage implement, and/or the like.

As shown, the air cart 12 may be configured to be towed directly behind the work vehicle 10, with the implement 14 being towed behind the air cart 12. In this regard, a hitch assembly 18 (FIG. 2) may be configured to couple the air cart 12 to the work vehicle 10. Although the hitch assembly 18 is illustrated in FIG. 2 as corresponding to a hitch of the air cart 12, the hitch assembly 18 may also correspond to a hitch of the work vehicle 10. Furthermore, a hitch assembly 20 may be configured to couple the implement 14 to the air cart 12. Although the hitch assembly 20 (FIG. 2) is illustrated as corresponding to a hitch of the implement 14, the hitch assembly 20 may also correspond to a hitch of the air cart 12. Additionally, in alternative embodiments, the implement 14 may be towed directly behind the work vehicle 10, with the air cart 12 being towed behind the implement 14. For example, in such embodiments, the implement 14 may be coupled to the work vehicle 10 via the hitch assembly 20 and the air cart 12 may be coupled to the implement 14 via the hitch assembly 18. In a further embodiment, the air cart 12 and the implement 14 may be part of a single unit that is towed behind the work vehicle 10, or elements of a self-propelled vehicle configured to distribute agricultural product across a field.

In several embodiments, the implement 14 may include a frame 22 configured to support or couple to various components of the implement 14, such as one or more ground-engaging tools 24. In general, the ground-engaging tools 24 may be configured to excavate a furrow or trench in soil 26 to facilitate deposition of a flowable granular or particulate-type agricultural product 28, such as seeds, fertilizer, and/or the like. For example, in the embodiment illustrated in FIG. 1, each ground-engaging tool 24 may be configured as an opening disk 30. Alternatively, in the embodiment shown in FIG. 2, each ground-engaging tool 24 may be configured as a hoe or shank 32. However, it should be appreciated that the ground-engaging tool 24 may be configured as any suitable device for creating a furrow in the soil 26 that is suitable for receiving the agricultural product 28. Furthermore, the implement 14 may generally include any number of ground-engaging tools 24 to facilitate delivery of the agricultural product 28 across a given swath of the soil 26. For instance, in one embodiment, the implement 14 may include twenty-four ground-engaging tools 24 spaced apart across the width of the implement 14. In alternative embodiments, however, the implement 14 may include any other suitable number of ground-engaging tools 24, such as less than twenty-four ground-engaging tools 24 or more than twenty-four ground-engaging tools 24. Additionally, the implement 14 may also include one or more closing wheels or disks 34 configured to close the furrow after the agricultural product 28 has been deposited into the furrow.

In accordance with aspects of the present disclosure, the air cart 12 may be configured to store the agricultural product 28 to be deposited within the soil 26. Specifically, in several embodiments, the air cart 12 may include a frame 36 configured to support or couple to various components of the air cart 12. For example, as shown, the frame 36 may be configured to support a hopper or storage tank 38 configured for storing the agricultural product 28 to be deposited within the furrow. In certain configurations, the hopper 38 may include multiple compartments for storing various different agricultural products. For example, one compartment may include seeds, and another compartment may include a dry/granular fertilizer. In some embodiments, the frame 36 may also be configured to support a metering system 40 (FIG. 2) and a fan or pressurized air source 42 (FIG. 2). Additionally, in one embodiment, a plurality of wheels 44 may be coupled to the frame 36 to permit the air cart 12 to be towed across a field by the work vehicle 10.

Furthermore, a plurality of delivery conduits 46 of the seeder 16 may be configured to convey the agricultural product 28 from the air cart 12 to the implement 14 for deposition into the furrow. Specifically, in several embodiments, the agricultural product 28 contained within the hopper 38 may be gravity fed into the metering system 40. As such, the metering system 40 may be configured to distribute a desired quantity of the agricultural product 28 to the delivery conduits 46. For example, in one embodiment, a primary header 48 (FIG. 2) coupled between the metering system 40 and the delivery conduits 46 may direct the agricultural product 28 into each of the delivery conduits 46. Pressurized air provided by the fan 42 to the delivery conduits 46 may then carry the agricultural product 28 through the delivery conduits 46 to the implement 14.

In several embodiments, each delivery conduit 46 may include a primary delivery tube 50, a secondary header 52, and a plurality of secondary delivery tubes 54. More specifically, the primary delivery tube 50 may be fluidly coupled between the primary header 48 and the associated secondary header 52. Each of the secondary delivery tubes 54 may, in turn, be fluidly coupled to the secondary header 52 so as to receive the agricultural product 28 from the associated primary delivery tube 52. In this regard, the secondary header 52 allocates the flow of the agricultural product 28 from the associated primary delivery tube 52 to each of the associated secondary delivery tubes 56. Each secondary delivery tube 56 may, in turn, be fluidly coupled to an associated dispensing device 56 (FIG. 3) of the implement 14. As will be described below, the dispensing devices 56 may be configured to deposit the agricultural product 28 into the furrow. In one embodiment, the primary delivery tube 50 of each delivery conduit 46 may extend between the air cart 12 and the implement 14, with the secondary header 52 and the secondary delivery tubes 54 of each delivery conduit 46 being positioned on the implement 14. However, it should be appreciated that, in alternative embodiments, the delivery conduits 46 may have any suitable configuration and/or may be positioned at any suitable location on the seeder 16. Furthermore, although the embodiment shown in FIG. 1 illustrates the seeder 16 including two delivery conduits 46, the seeder 16 may include any suitable number of delivery conduits 46, such as more than two delivery conduits 46.

It should be appreciated that the configuration of the work vehicle 10, the air cart 12, and the implement 14 described above and shown in FIGS. 1 and 2 is provided only to place the present subject matter in an exemplary field of use. Thus, it should be appreciated that the present subject matter may be readily adaptable to any manner of work vehicle, air cart, and/or implement configuration.

Figure 3:
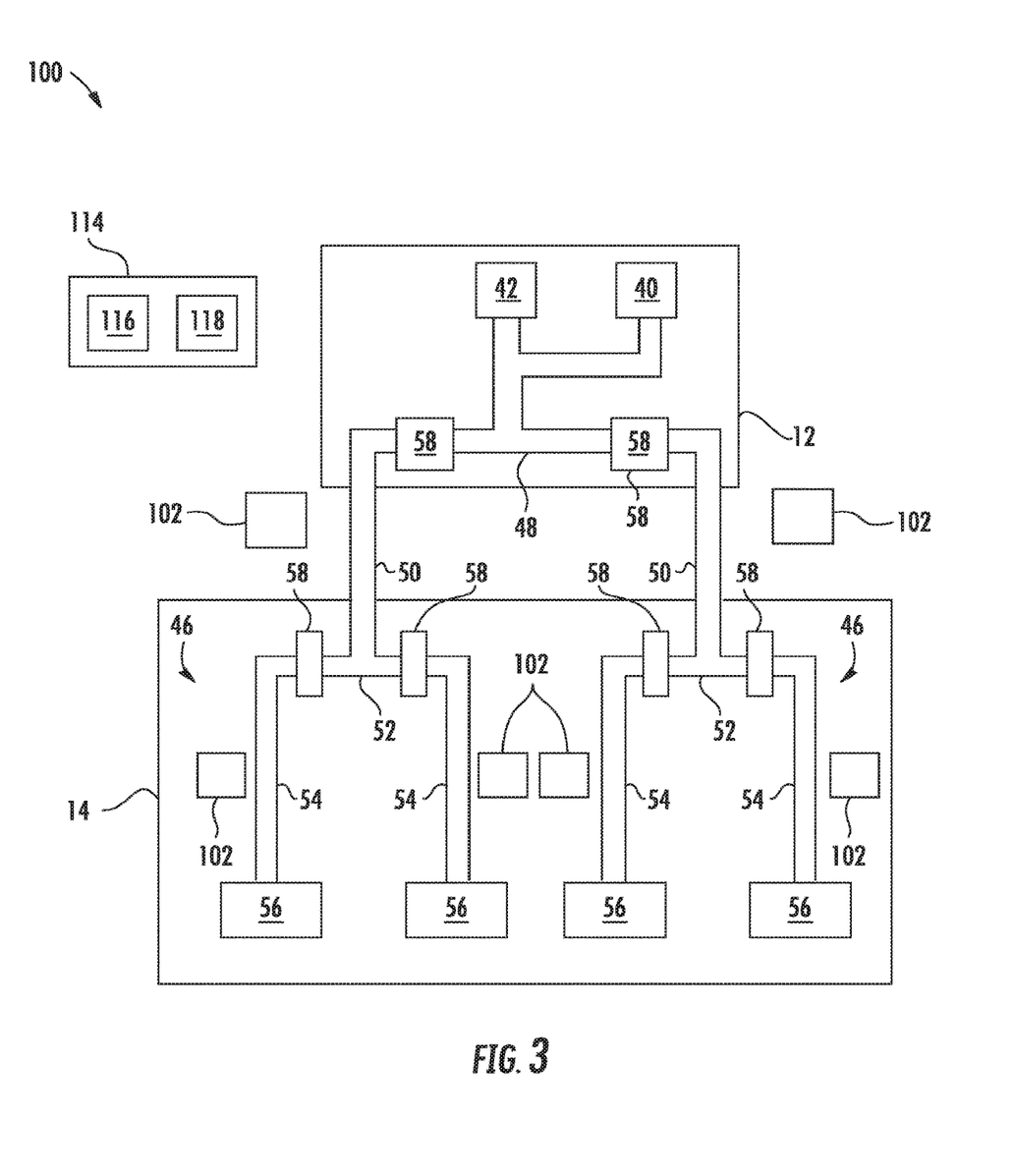
FIG. 3 illustrates a schematic view of one embodiment of a system for removing blockages present in a delivery conduit of a seeder in accordance with aspects of the present subject matter.

Referring now to FIG. 3, a schematic view of one embodiment of a system 100 for removing blockages present in a delivery conduit of a seeder is illustrated in accordance with aspects of the present subject matter. In general, the system 100 will be described herein with reference to the embodiments of the work vehicle 10, the air cart 12, and the implement 14 described above with reference to FIGS. 1 and 2. However, it should be appreciated by those of ordinary skill in the art that the disclosed system 100 may generally be utilized with work vehicles having any other suitable work vehicle configuration, air carts having any other suitable air cart configuration, and/or implements having any other suitable implement configuration.

As shown in FIG. 3, the system 100 may include a plurality of delivery conduits 46 (only two of which are shown in the illustrated embodiment). As indicated above, each delivery conduit 46 may include a primary delivery tube 50 extending between the primary header 48 and an associated secondary header 52. In addition, each delivery conduit 46 may include a plurality of secondary delivery tubes 54 (only two of which are shown in FIG. 3) fluidly coupled to the associated secondary header 52 such that each secondary delivery tube 54 is configured to receive the agricultural product 28 from its respective primary delivery tube 50.

Additionally, the system 100 may include a plurality of dispensing devices 56 of the implement 14, with each dispensing device 56 being provided in operative association with one of secondary delivery tubes 54. In general, each dispensing device 56 may be configured to receive the agricultural product 28 conveyed through its respective secondary delivery tube 54 and deposit such agricultural product 28 into the furrow. In this regard, each of the dispensing devices 56 is also associated with one of the ground-engaging tools 24 of the implement 14 so as to deposit the agricultural product 28 into the furrow created by the associated ground-engaging tool 24. It should be appreciated that, in general, each dispensing device 56 may correspond to any device or structure suitable for depositing the agricultural product 28 into the furrow, such as a seed meter, a conveyor belt, a pipe through which the agricultural product 28 travels under the influence of gravity, an open end of the associated secondary delivery tube 54, and/or the like.

Moreover, the system 100 may also include a plurality of flow blocking devices 58, with each flow blocking device 58 being provided in operative association with one of the primary or secondary delivery tubes 50, 54. In general, each flow blocking device 58 may be configured to selectively occlude a flow of air (e.g., pressurized air provided by the fan 42) through its associated delivery tube 50, 54. For example, as illustrated in FIG. 3, in one embodiment, a flow blocking device 58 may be in operative association with each of the primary and secondary delivery tubes 50, 54. In such embodiment, the flowing blocking devices 58 provided in operative association with the primary delivery tubes 50 may, for example, be positioned within or otherwise associated with the primary header 48, while the flowing blocking devices 58 provided in operative association with the secondary delivery tubes 50 may, for example, be positioned within or otherwise associated with the secondary headers 54. However, it should be appreciated that, in alternative embodiments, the flow blocking devices 58 may be positioned at any suitable location that permits selective blocking of the flow of air through the associated delivery tube 50, 54. Moreover, in some embodiments, the flow blocking devices 58 may be in operative association with only the primary delivery tubes 50 or only the secondary delivery tubes 54.

It should be appreciated that each flow blocking device 58 may correspond to any device or structure suitable for occluding the flow of air through the associated delivery tube 50, 54, such as a gate, a trap door, a sliding door, a quarter-turn valve, a ball valve, a butterfly valve, and/or the like. In one embodiment, each flow blocking device 58 may correspond to an electronically controlled device, such as an electronically controlled valve or gating device. However, in other embodiments, the flow blocking devices 58 may correspond to manually controlled devices.

In accordance with aspects of the present disclosure, the system 100 may also include a plurality of blockage sensors 102, with each sensor 102 being provided in operative association with one of the primary or secondary delivery tubes 50, 54. In general, the sensors 102 may be configured to detect a parameter indicative of the presence of a blockage within the associated delivery tube 50, 54. For example, as illustrated in FIG. 3, in one embodiment, a sensor 102 may be in operative association with each of the primary and secondary delivery tubes 50, 54. However, it should be appreciated that, in alternative embodiments, the sensors 102 may be provided in operative association with only the primary delivery tubes 50 or only the secondary delivery tubes 54.

Additionally, as shown in FIG. 3, the system 100 may further include a controller 114 configured to electronically control the operation of one or more components of the work vehicle 10, the air cart 12, and/or the implement 14. In general, the controller 114 may comprise any suitable processor-based device known in the art, such as a computing device or any suitable combination of computing devices. Thus, in several embodiments, the controller 114 may include one or more processor(s) 116 and associated memory device(s) 118 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 118 of the controller 114 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 118 may generally be configured to store suitable computer-readable instructions that, when implemented by the processor(s) 116, configure the controller 114 to perform various computer-implemented functions, such as one or more aspects of the method 200 described below with reference to FIG. 7. In addition, the controller 114 may also include various other suitable components, such as a communications circuit or module, one or more input/output channels, a data/control bus, and/or the like.

It should be appreciated that the controller 114 may correspond to an existing controller of the work vehicle 10, the air cart 12, or the implement 14 or the controller 114 may correspond to a separate processing device. For instance, in one embodiment, the controller 114 may form all or part of a separate plug-in module that may be installed within the work vehicle 10, the air cart 12, or the implement 14 to allow for the disclosed system and method to be implemented without requiring additional software to be uploaded onto existing control devices of the work vehicle 10, the air cart 12, or the implement 14.

Figure 4:
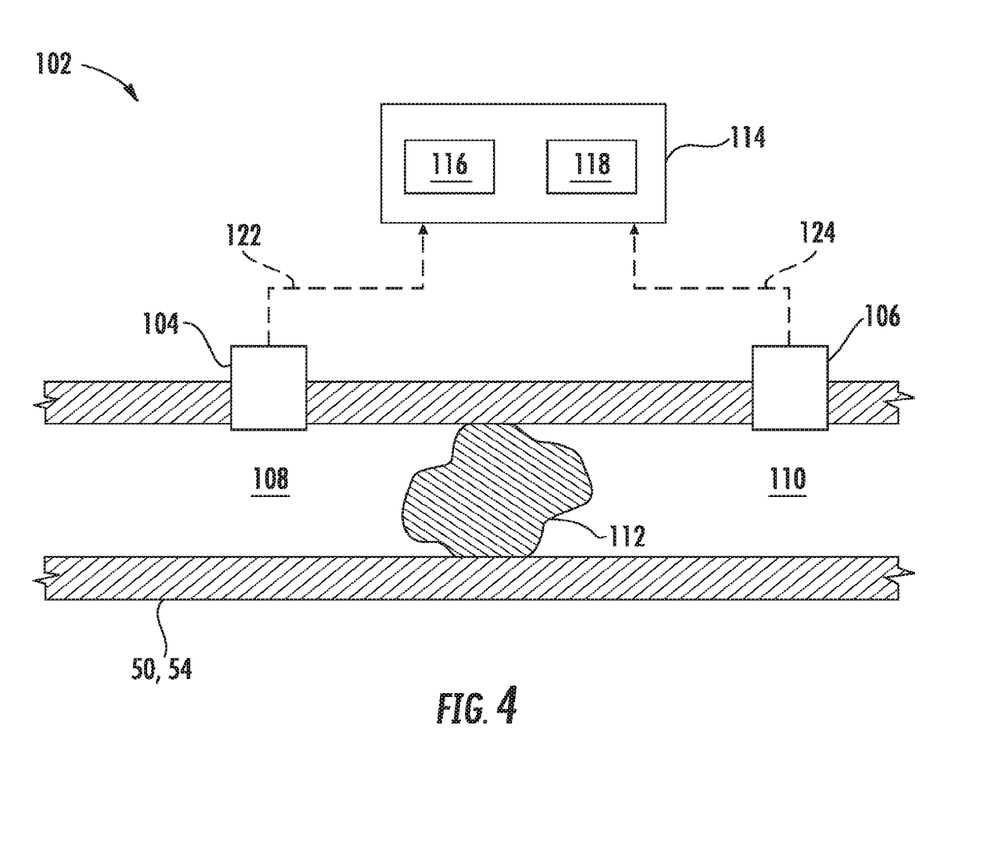
FIG. 4 illustrates a schematic view of one embodiment of a blockage sensor in accordance with aspects of the present subject matter.

Referring now to FIG. 4, a schematic view of one embodiment of a blockage sensor 102 suitable for use within the disclosed system 100 is illustrated in accordance with aspects of the present disclosure. As shown, the blockage sensor 102 may include first and second pressure sensors 104, 106 provided in operative association with its associated delivery tube 50, 54. Specifically, the first pressure sensor 104 may be configured to detect a parameter indicative of an air pressure at a first location 108 within the delivery tube 50, 54. Similarly, the second pressure sensor 106 may be configured to detect a parameter indicative of an air pressure at a second location 110 within the delivery tube 50, 54, with the second location 110 being positioned downstream of the first location 108. For example, the first location 108 may be at an upstream location of the delivery tube 50, 54, while the second location 110 may be positioned at a downstream location of the delivery tube 50, 54. As will be described below, a pressure differential between the first and second locations 108, 110 may be indicative of the presence of a blockage 112 in the associated delivery tube 50, 54. It should be appreciated that, in alternative embodiments, each sensor 102 may correspond to any other suitable sensor(s) or sensing device(s) configured to detect a parameter indicative of the presence of a blockage 112 in the associated delivery tube 50, 54, such as a flow meter, a single pressure sensor, an optical sensor, and/or the like.

Figure 5:
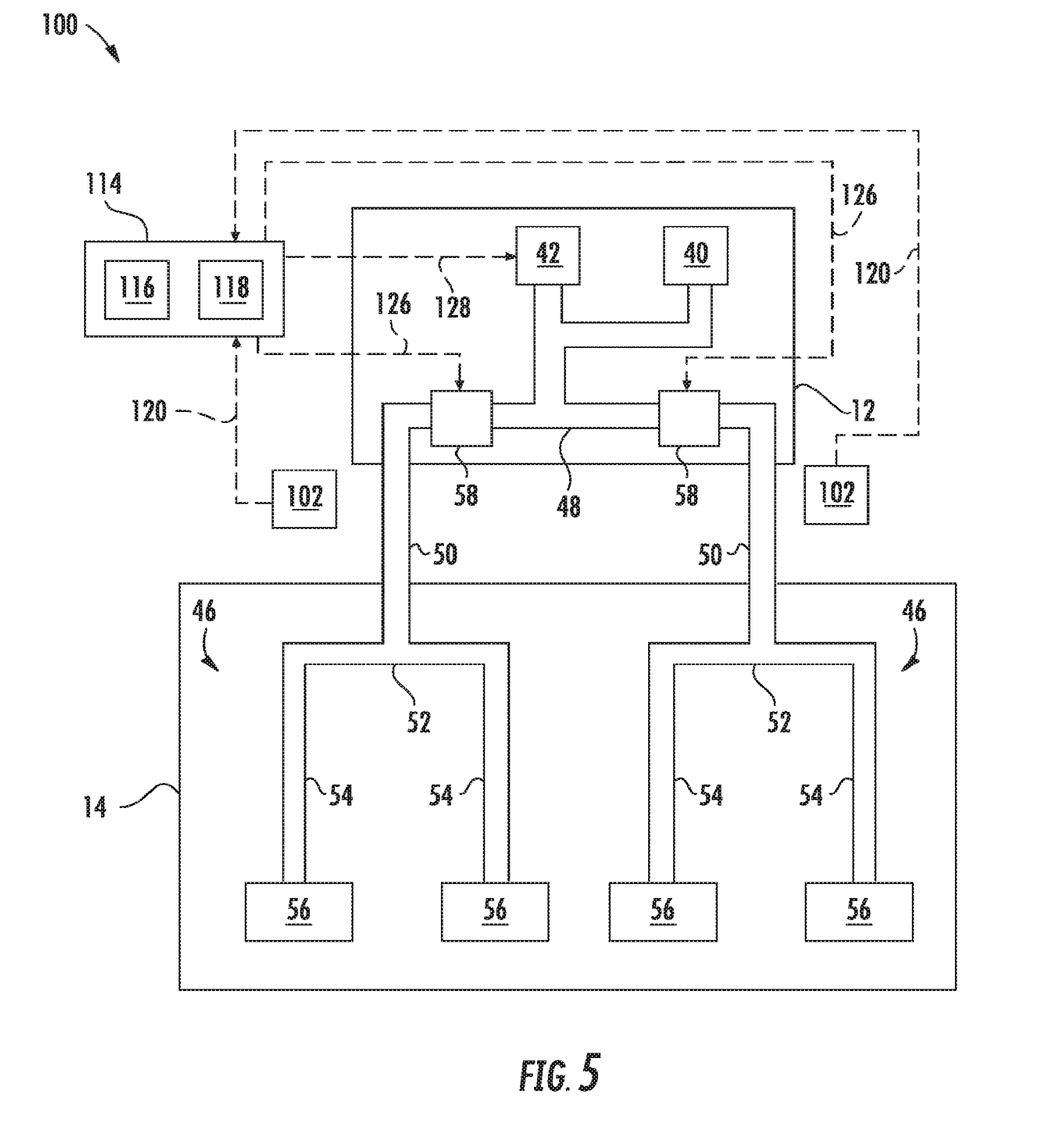
FIG. 5 illustrates a simplified schematic view of the system shown in FIG. 3, particularly illustrating the system being configured to remove a blockage present in one of a plurality of primary delivery tubes in accordance with aspects of the present subject matter.
Figure 6:
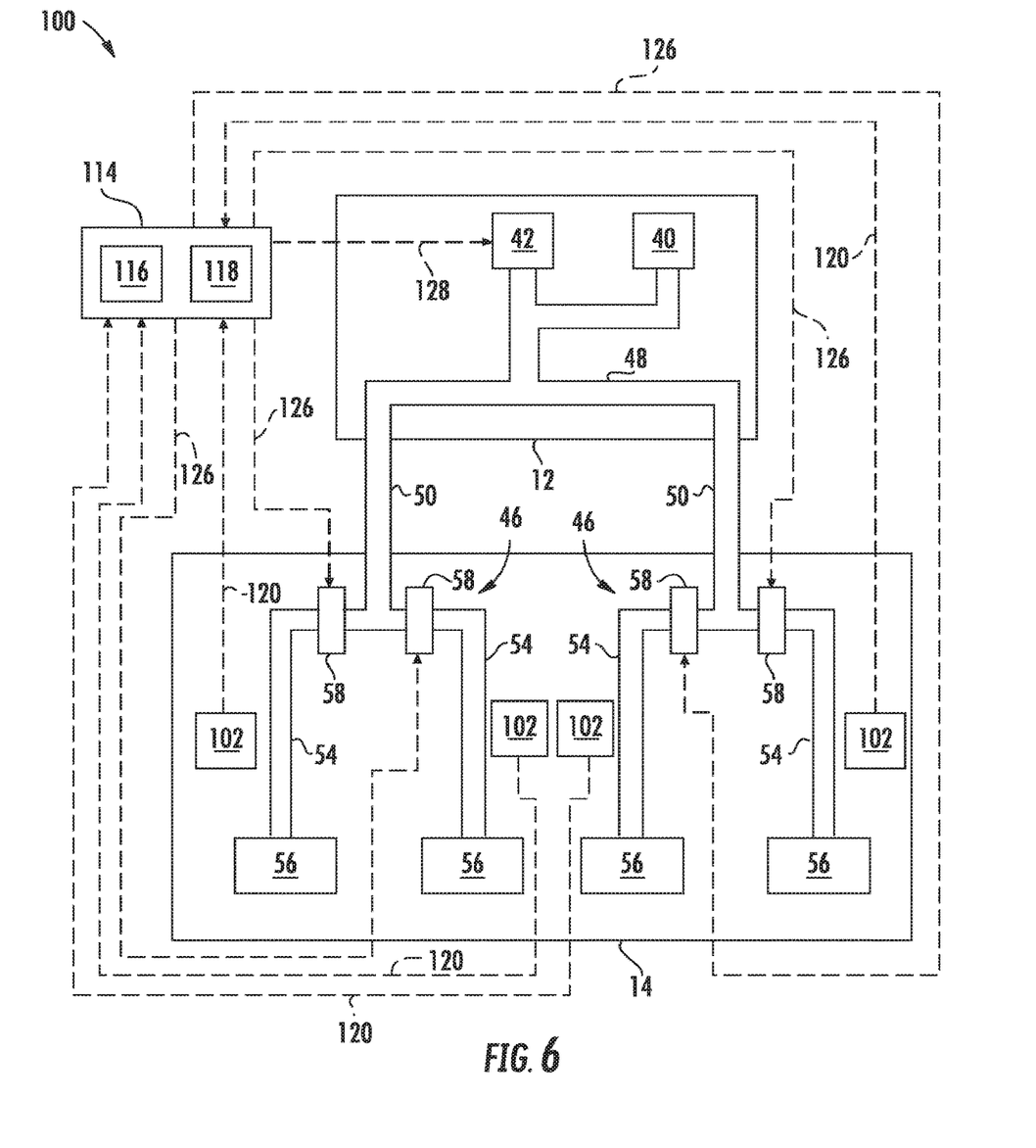
FIG. 6 illustrates a simplified schematic view of the system shown in FIG. 3, particularly illustrating the system being configured to remove a blockage present in one of a plurality of secondary delivery tubes in accordance with aspects of the present subject matter.

Referring now to FIGS. 5 and 6, simplified schematic views of specific embodiments of the system 100 shown in FIG. 3 are illustrated in accordance with aspects of the present subject matter. Specifically, FIG. 5 illustrates an embodiment of the system 100 in which the flow blocking devices 58 and blockage sensors 102 are provided in operative association with the primary delivery tubes 50 such that the system 100 is configured to detect and remove a blockage present in one of the primary delivery tubes 50. Additionally, FIG. 6 illustrates an embodiment of the system 100 in which the flow blocking devices 58 and the blockage sensors 102 are provided in operative association with the secondary delivery tubes 54 such that the system 100 is configured to detect and remove a blockage present in one of the secondary delivery tubes 54. It should be appreciated that FIGS. 5 and 6 only show the flow blocking devices 58 and blockage sensors 102 in association with the either the primary delivery tubes 50 (FIG. 5) or the secondary delivery tubes 54 (FIG. 6) for purposes of description and clarity of the illustrated embodiments. As indicated above with reference to FIG. 3, the flow blocking devices 58 and blockage sensors 102 may, in other embodiments, be provided in association with both the primary delivery tubes 50 and the secondary delivery tubes 54 to allow for the detection and removal of blockages across all of such delivery tubes 50, 54.

As illustrated in FIG. 5, in several embodiments, the controller 114 may be configured to determine when a blockage is present within one of the primary delivery tubes 50. Specifically, the controller 114 may be communicatively coupled to the blockage sensors 102 associated with the primary delivery tubes 50, such as the pressure sensors 104, 106, via a wired or wireless connection to allow measurement signals (e.g., indicated by dashed lines 120 in FIG. 5) to be transmitted from each sensor 102 to the controller 114. The controller 114 may then be configured determine or estimate when a blockage is present in one of the primary delivery tubes 50 based on the measurement signals 120 received from the associated blockage sensor 102. For instance, the controller 114 may include a look-up table or suitable mathematical formula stored within its memory 118 that correlates the sensor measurements to the presence or absence of a blockage in the associated primary delivery tube 50. Additionally, in one embodiment, the controller 114 may be configured to transmit a notification to the operator of the seeder 16 (e.g., by causing a visual or audible notification or indicator to be presented to the operator) that provides an indication that a blockage is present in one of the primary delivery tubes 50.

As described above with reference to FIG. 4, the controller 114 may, in one embodiment, be configured to monitor a pressure differential within each of the primary delivery tubes 50, with the pressure differential being indicative of the presence of a blockage within the associated primary delivery tube 50. Specifically, the controller 114 may be configured to receive both measurement signals (e.g., indicated by dashed line 122 in FIG. 4) from the first pressure sensor 104 of each blockage sensor 102 and measurement signals (e.g., indicated by dashed line 124 in FIG. 4) from the second pressure sensor 106 of each blockage sensor 102. The controller 114 may then be configured determine the pressure differential between the first and second locations 108, 110 associated with the pressure sensors 104, 106 based on the measurement signals 122, 124. In such an embodiment, when the determined pressure differential exceeds a threshold pressure differential, the controller 114 may, for example, be configured to determine that a blockage is present in the associated primary delivery tube 50.

Referring again to FIG. 5, when it is determined that a blockage is present in one of the primary delivery tubes 50, the controller 114 may be configured to control the flow blocking device(s) 58 associated with the other primary delivery tube(s) 50 (i.e., the primary delivery tubes(s) 50 in which no blockage is present) to occlude the flow of air through such unblocked primary delivery tubes(s) 50. Specifically, in several embodiments, the controller 114 may be configured to transmit control signals (e.g., as indicated by dashed lines 126 in FIG. 5) to the flow blocking devices 58 associated with the unblocked primary delivery tubes(s) 50 instructing such flow blocking devices(s) 58 to occlude the flow of air through the associated primary delivery tube(s) 50. As such, by blocking the flow of air through the unblocked primary delivery tube(s) 50, the air pressure within the blocked primary delivery tube 50 may be increased. This increase in the air pressure may serve to remove the blockage by pushing or forcing it through the corresponding primary delivery tube 50 towards the downstream dispensing device 56.

Furthermore, in some embodiments, the controller 114 may also be configured to continue to monitor the measurement signals 120 received from the blockage sensors 102 after determining that a blockage is present in one of the primary delivery tubes 50. Once the blockage is removed, the controller 114 may be configured to transmit control signals 126 to the flow blocking device(s) 58 associated with the unblocked primary delivery tube(s) 50 instructing such flow blocking device(s) 58 to open up or otherwise permit the flow of air back through the associated primary delivery tube(s) 50.

It should be appreciated that, in certain instances, the increase in air pressure created by occluding the air flow through the unblocked primary delivery tube(s) 50 may be insufficient to remove the blockage from the blocked primary delivery tube 50, which may be sensed by the controller 114 when the monitored parameter remains constant after a time period has elapsed following the occlusion of the flow of air through the unblocked primary delivery tubes 50. In such instances, the controller 114 may be configured to transmit suitable control signals 126 to the flow blocking device(s) 58 associated with the unblocked primary delivery tube(s) 50 instructing such flow blocking device(s) 58 to permit the flow of air through the associated primary delivery tube(s) 50, thereby preventing increased wear on the fan 42. Additionally, in such instances, the controller 114 may also be configured to transmit a notification to the operator of the seeder 16 (e.g., by causing a visual or audible notification or indicator to be presented to the operator) providing an indication that the detected blockage cannot be removed from the primary delivery tube 50. The operator may then attempt to remove the blockage using any other suitable correction action, such as by manually unblocking the delivery tube 50.

Referring now to FIG. 6, in several embodiments, the controller 114 may be configured to determine when a blockage is present within one of the secondary delivery tubes 54. Specifically, the controller 114 may be communicatively coupled to the blockage sensors 102 associated with the secondary delivery tubes 54, such as the pressure sensors 104, 106, via a wired or wireless connection to allow measurement signals 120 to be transmitted from each sensor 102 to the controller 114. The controller 114 may then be configured determine or estimate when a blockage is present in one of the secondary delivery tubes 54 based on the measurement signals 120 received from each associated blockage sensor 102. For instance, the controller 114 may include a look-up table or suitable mathematical formula stored within its memory 118 that correlates the sensor measurements from each blockage sensor 102 to the presence or absence of a blockage in the associated secondary delivery tube 54. Additionally, in one embodiment, the controller 114 may be configured to transmit a notification to the operator of the seeder 16 (e.g., by causing a visual or audible notification or indicator to be presented to the operator) that provides an indication that a blockage is present in one of the secondary delivery tubes 54.

Similar to the embodiment described above with reference to FIG. 5, when a blockage is detected in one of the secondary delivery tubes 54, the controller 114 may be configured to control the flow blocking devices(s) 58 associated with the unblocked secondary delivery tube(s) 54 of the associated delivery conduit 46 to occlude the flow of air through such unblocked secondary delivery tubes 54. Specifically, in several embodiments, the controller 114 may be configured to transmit control signals 126 to the flow blocking devices 58 associated with the unblocked secondary delivery tubes 54 instructing the associated flow blocking device(s) 58 to occlude the flow of air through such tube(s) 54. By blocking the flow of air through the unblocked secondary delivery tubes 54 of the associated delivery conduit 46, the air pressure within the blocked secondary delivery tube 54 may be increased. This increase in the air pressure may serve to remove the blockage by pushing or forcing it through the corresponding secondary delivery tube 54 towards the downstream dispensing device 56.

Furthermore, in some embodiments, the controller 114 may also be configured to continue to monitor the measurement signals 120 received from the blockage sensors 102 after determining that a blockage is present in one of the secondary delivery tubes 54. Once the blockage is removed, the controller 114 may be configured to transmit control signals 126 to the flow blocking device(s) 58 associated with the unblocked secondary delivery tube(s) 54 instructing such flow blocking device(s) 58 to open up or otherwise permit the flow of air back through the associated secondary delivery tube(s) 54.

It should be appreciated that, in certain instances, the increase in air pressure created by occluding the air flow through the unblocked secondary delivery tube(s) 54 may be insufficient to remove the blockage from the blocked secondary delivery tube 54, which may be sensed by the controller 114 when the monitored parameter remains constant after a time period has elapsed following the occlusion of the flow of air through the unblocked secondary delivery tubes 54. In such instances, the controller 114 may be configured to transmit suitable control signals 126 to the flow blocking device(s) 58 associated with the unblocked secondary delivery tube(s) 54 instructing such flow blocking device(s) 58 to permit the flow of air through the associated secondary delivery tube(s) 54, thereby preventing increased wear on the fan 42. Additionally, in such instances, the controller 114 may also be configured to transmit a notification to the operator of the seeder 16 (e.g., by causing a visual or audible notification or indicator to be presented to the operator) providing an indication that the detected blockage cannot be removed from the secondary delivery tube 54. The operator may then attempt to remove the blockage using any other suitable correction action, such as by manually unblocking the delivery tube 54.

In some embodiments, the controller 114 may be configured to control the flow blocking devices 58 associated with the primary delivery tubes 50 independently of the flow blocking devices 58 associated with the secondary delivery tubes 54. More specifically, when a blockage is present in one of the primary delivery tubes 50, the flow blocking devices 58 associated with the secondary delivery tubes 54 may remain open. Similarly, when a blockage is present in one of the secondary delivery tubes 54, the flow blocking devices 58 associated with the primary delivery tubes 50 may remain open. Furthermore, in one embodiment, the controller 114 may be configured to control the flow blocking devices 58 associated with the secondary delivery tubes 54 of one delivery conduit 46 independently of the flow blocking devices 58 associated with the secondary delivery tubes 54 of the other delivery conduits 46. In this regard, when a blockage is present within one of the secondary delivery tubes 54 of one of the delivery conduits 46, the secondary delivery tubes 54 of the other of delivery conduits 46 may remain open. However, in an alternative embodiment, when a blockage is present within one of the secondary delivery tubes 54, all of the other secondary delivery tubes 54 of the all of the delivery conduits 46 may be closed.

Additionally, in one embodiment, the controller 114 may be configured to control the fan 42 of the disclosed system 100 such that the fan 42 operates at a constant speed regardless of the presence or absence of a blockage in the primary or secondary delivery tubes 50, 54. Specifically, the controller 114 may be communicatively coupled to the fan 40 via a wired or wireless connection to allow control signals (e.g., indicated by dashed lines 128 in FIGS. 5 and 6) to be transmitted from the controller 114 to the fan 40. As such, the control signals 128 may instruct the fan 40 to operate at a constant or substantially constant speed (e.g., a constant rotational speed of a shaft of the fan 40) so as to provide a constant flow of air to the primary or secondary delivery tubes 50, 54. However, in alternative embodiments, the controller 114 may be configured to control the fan 42 of the disclosed system 100 such that the fan 42 operates at an increased speed a blockage is present within one of the primary or secondary delivery tubes 50, 54.

Figure 7:
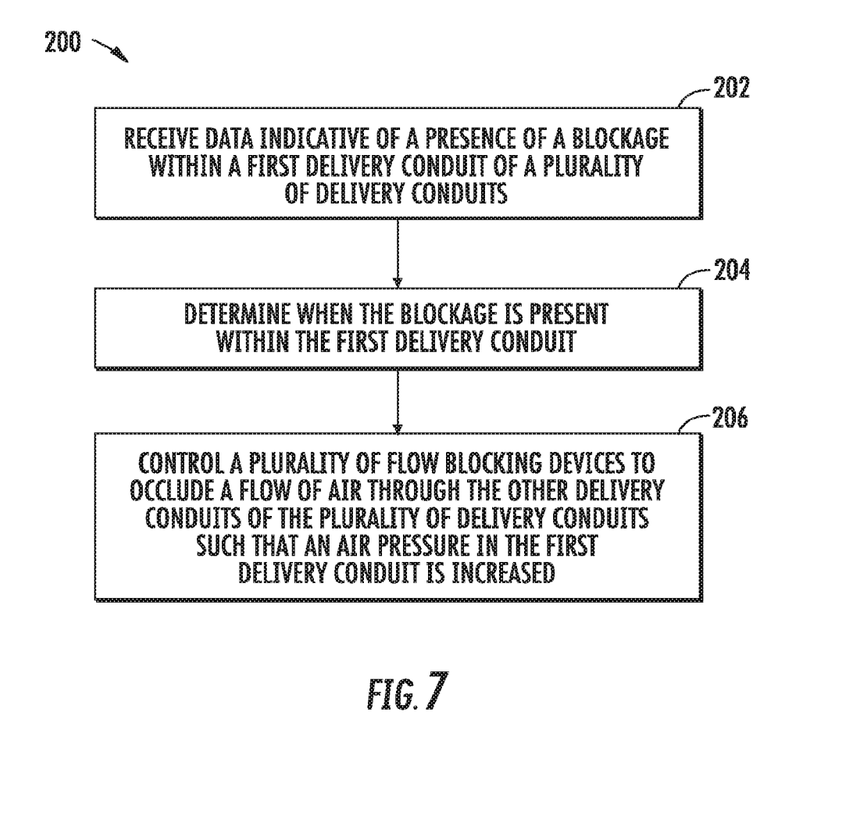
FIG. 7 is a flow diagram of one embodiment of a method for removing blockages present in a delivery conduit of a seeder in accordance with aspects of the present subject matter.

Referring now to FIG. 7, a flow diagram of one embodiment of a method 200 for removing blockages present within a delivery conduit of a seeder is illustrated in accordance with aspects of the present subject matter. In general, the method 200 will be described herein with reference to the work vehicle 10, the air cart 12, the implement 14, and the system 100 described above with reference to FIGS. 1-6. However, it should be appreciated by those of ordinary skill in the art that the disclosed method 200 may generally be utilized to removing blockages present in a delivery conduit for any work vehicle having a suitable work vehicle configuration, any air cart having a suitable air cart configuration, and/or any implement having any suitable implement configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving data indicative of the presence of a blockage within a first delivery conduit of a plurality of delivery conduits of a seeder. For instance, as indicated above, the controller 114 may be communicatively coupled to a plurality of blockage sensors 102, with each sensor 102 being configured detect a parameter indicative of the presence of a blockage within one of the delivery conduits 46, such as one of the primary or secondary delivery tubes 50, 54.

Additionally, at (204), the method 200 may include determining when the blockage is present within the first delivery conduit. For instance, the controller 114 may be configured to determine when a blockage is present within one of the delivery conduits 46, such as one of the primary or secondary delivery tubes 50, 54, based the measurement signals or sensor data 120 received from the sensors 102.

Moreover, as shown in FIG. 7, at (206), the method 200 may include controlling a plurality of flow blocking devices to occlude a flow of air through the other unblocked delivery conduits of the plurality of delivery conduits when the blockage is present within the first delivery conduit such that an air pressure in the first delivery conduit is increased. For instance, when a blockage is present in one of the delivery conduits 46, the controller 114 may be configured to transmit control signals 126 to the flow blocking devices 58 associated with the other unblocked delivery conduits 46 instructing such flow blocking devices 58 to occlude the flow of air through their associated delivery conduits 46. Specifically, in one embodiment, when a blockage is present in one of the primary delivery tubes 50, the controller 114 may be configured to transmit the control signals 126 to the flow blocking devices 58 associated with the other primary delivery tubes 50 instructing those flow blocking devices 58 to occlude the flow of air through their associated primary delivery tubes 50. In another embodiment, when a blockage is present in one of the secondary delivery tubes 54, the controller 114 may be configured to transmit the control signals 126 to the flow blocking devices 58 associated with the other secondary delivery tubes 54 of the associated delivery conduit 46 instructing those flow blocking devices 58 to occlude the flow of air through their associated secondary delivery tubes 54.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for removing blockages present within a delivery conduit of a seeder, the seeder including a plurality of delivery conduits and a plurality of flow blocking devices, the method comprising:
   receiving, with a computing device, data indicative of a presence of a blockage within a first delivery conduit of the plurality of delivery conduits;
   determining, with a computing device, when the blockage is present within the first delivery conduit; and
   controlling, with the computing device, the flow blocking devices to occlude a flow of air through the other delivery conduits of the plurality of delivery conduits such that an air pressure in the first delivery conduit is increased.

2. The method of claim 1, further comprising:
   controlling, with the computing device, the flow blocking devices to permit the flow of air back through the other delivery conduits when the blockage is removed from the first delivery conduit.

3. The method of claim 1, wherein the plurality of delivery conduits comprises a plurality of primary delivery tubes, each of the primary delivery tubes being coupled to a plurality of secondary delivery tubes, the method further comprising:
   determining, with the computing device, when the blockage is present within a first primary delivery tube of the plurality of primary delivery tubes; and
   controlling, with the computing device, the flow blocking devices to occlude the flow of air through the other primary delivery tubes of the plurality of primary delivery tubes.

4. The method of claim 1, wherein the plurality of delivery conduits comprises a plurality of primary delivery tubes, each of the primary delivery tubes being coupled to a plurality of secondary delivery tubes, the method further comprising:
   determining, with the computing device, when the blockage is present within a first secondary delivery tube of the plurality of secondary delivery tubes of one of the delivery conduits; and
   controlling, with the computing device, the flow blocking devices to occlude the flow of air through the other secondary delivery tubes of the plurality of secondary delivery tubes of the associated delivery conduit.

5. The method of claim 1, further comprising:
   operating, with the computing device, a fan of the seeder to operate at a constant speed.

6. The method of claim 1, further comprising:
   initiating, with the computing device, a control action associated with notifying an operator of the seeder when the blockage is present in the first delivery conduit.

7. The method of claim 1, further comprising:
   controlling, with the computing device, the flow blocking devices to permit the flow of air through the other delivery conduits when the data remains constant after a time period has elapsed following occlusion of the flow of air through the other delivery conduits.

8. The method of claim 7, further comprising:
   initiating, with the computing device, a control action associated with notifying an operator of the seeder when the monitored parameter remains constant after the time period has elapsed following occlusion of the flow of air through the other delivery conduits.

* * * * *